US006718759B1

(12) United States Patent
Tabor

(10) Patent No.: US 6,718,759 B1
(45) Date of Patent: Apr. 13, 2004

(54) VELOCITY BASED METHOD FOR CONTROLLING A HYDRAULIC SYSTEM

(75) Inventor: Keith A. Tabor, Richfield, WI (US)

(73) Assignee: Husco International, Inc., Waukesha, WI (US)

( * ) Notice: Subject to any disclaimer, the term of this patent is extended or adjusted under 35 U.S.C. 154(b) by 0 days.

(21) Appl. No.: 10/254,128

(22) Filed: Sep. 25, 2002

(51) Int. Cl.[7] .......................................... F16B 11/10

(52) U.S. Cl. ........................ 60/368; 60/460; 91/361; 91/459

(58) Field of Search ...................... 60/368, 422, 433, 60/459, 460, 466; 91/361, 364, 444, 446, 454, 455, 456, 457, 459

(56) References Cited

U.S. PATENT DOCUMENTS 3,954,046 A 5/1976 Stillhard
4,061,155 A 12/1977 Sopha
4,250,794 A 2/1981 Haak et al.
4,437,385 A 3/1984 Kramer et al.
5,201,177 A 4/1993 Kim
5,249,140 A 9/1993 Kessler
5,490,384 A 2/1996 Lunzman
5,666,806 A 9/1997 Dietz
5,701,793 A 12/1997 Gardner et al.
5,784,945 A * 7/1998 Krone et al. ................ 91/361
5,878,647 A 3/1999 Wilke et al.
5,947,140 A 9/1999 Aardema et al.
5,960,695 A * 10/1999 Aardema et al. ............ 91/459
6,282,891 B1 9/2001 Rockwood
6,467,264 B1 * 10/2002 Stephenson et al. .......... 60/460
6,609,369 B2 * 8/2003 Koehler et al. ............... 60/459

OTHER PUBLICATIONS

Arne Jansson, et al., "Separate Controls of Meter–in and Meter–out Orifices in Mobile Hyraulic Systems," SAE Technical Papers Series, Sep. 1999, pp. 1–7, SAE International, Warrendale, PA.

* cited by examiner

*Primary Examiner*—Thomas E. Lazo
(74) *Attorney, Agent, or Firm*—George E. Haas; Quarles & Brady LLP

(57) ABSTRACT

A hydraulic circuit branch includes a hydraulic actuator, such as a cylinder, and an assembly of one or more electrohydraulic proportional valves connected in series between a pressurized fluid supply line and a tank return line. The force acting on the hydraulic actuator is determined by sensing fluid pressures produced by the hydraulic actuator. Pressures in the supply and tank return lines also are sensed. The sensed pressures and a desired velocity for the hydraulic actuator are employed to determine an equivalent flow coefficient, which characterizes fluid flow through the hydraulic circuit branch, either a conduction or restriction coefficient may be derived. The equivalent flow coefficient is used to determine how to activate each electrohydraulic proportional valve to achieve the desired velocity of the hydraulic actuator. The equivalent flow coefficient also is employed to control the pressure levels in the supply and tank return lines.

42 Claims, 2 Drawing Sheets

VELOCITY BASED METHOD FOR CONTROLLING A HYDRAULIC SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to electrohydraulic systems for operating machinery, and in particular to control algorithms for such systems.

2. Description of the Related Art

A wide variety of machines have moveable members which are operated by an hydraulic actuator, such as a cylinder and piston arrangement, that is controlled by a hydraulic valve. Traditionally the hydraulic valve was manually operated by the machine operator. There is a present trend away from manually operated hydraulic valves toward electrical controls and the use of solenoid operated valves. This type of control simplifies the hydraulic plumbing as the control valves do not have to be located near an operator station, but can be located adjacent the actuator being controlled. This change in technology also facilitates sophisticated computerized control of the machine functions.

Application of pressurized hydraulic fluid from a pump to the actuator can be controlled by a proportional solenoid operated spool valve that is well known for controlling the flow of hydraulic fluid. Such a valve employs an electromagnetic coil which moves an armature connected to the spool that controls the flow of fluid through the valve. The amount that the valve opens is directly related to the magnitude of electric current applied to the electromagnetic coil, thereby enabling proportional control of the hydraulic fluid flow. Either the armature or the spool is spring loaded to close the valve when electric current is removed from the solenoid coil. Alternatively a second electromagnetic coil and armature is provided to move the spool in the opposite direction.

When an operator desires to move a member on the machine a joystick is operated to produce an electrical signal indicative of the direction and desired rate at which the corresponding hydraulic actuator is to move. The faster the actuator is desired to move the farther the joystick is moved from its neutral position. A control circuit receives a joystick signal and responds by producing a signal to open the associated valve. A solenoid moves the spool valve to supply pressurized fluid through an inlet orifice to the cylinder chamber on one side of the piston and to allow fluid being forced from the opposite cylinder chamber to drain through an outlet orifice to a reservoir, or tank. A hydromechanical pressure compensator maintains a nominal pressure (margin) across the inlet orifice portion of the spool valve. By varying the degree to which the inlet orifice is opened (i.e. by changing its valve coefficient), the rate of flow into the cylinder chamber can be varied, thereby moving the piston at proportionally different speeds. Thus prior control methods were based primarily on inlet orifice metering using an external hydromechanical pressure compensator.

Recently a set of proportional solenoid operated pilot valves has been developed to control fluid flow to and from the hydraulic actuator, as described in U.S. Pat. No. 5,878,647. In these valves, the solenoid armature acts on a pilot poppet that controls the flow of fluid through a pilot passage in a main valve poppet. The armature is spring loaded to close the valve when electric current is removed from the solenoid coil.

The control of an entire machine, such as an agricultural tractor or construction equipment is complicated by the need to control multiple functions simultaneously. For example, in order to operate a back hoe, hydraulic actuators for the boom, arm, bucket, and swing have to be simultaneously controlled. The loads acting on each of those machine members often are significantly different so that their respective actuators require hydraulic fluid at different pressures. The pump often is a fixed displacement type with the outlet pressure being controlled by an unloader. Therefore, the unloader needs to be controlled in response to the function requiring the greatest pressure for its actuator. In some cases the pump may be incapable of supplying enough hydraulic fluid for all of the simultaneously operating functions. At those times it is desirable that the control system allocate the available hydraulic fluid among those functions in an equitable manner, taking into account that some function may deserve fluid on a higher priority than other functions.

SUMMARY OF THE INVENTION

A branch of a hydraulic system has a hydraulic actuator connected between a supply line containing pressurized fluid and a return line connected to a tank. The method for operating the hydraulic system comprises requesting a desired velocity for the hydraulic actuator. Such a request may emanate from an operator input device for the machine on which the hydraulic circuit is a component. A parameter, which varies with changes of a force acting on the hydraulic actuator, is sensed to provide an indication of that force. For example, this parameter may be pressure at the hydraulic actuator which indicates the load on the hydraulic actuator.

An equivalent flow coefficient, characterizing the fluid flow through the hydraulic system branch that is required to achieve the desired velocity, is derived based on the desired velocity and the sensed parameter. Fluid flow and/or pressure in the hydraulic system can be controlled based on the equivalent flow coefficient. For example, valves in the system are opened to a degree that is determined from the equivalent flow coefficient in order to operate the hydraulic actuator at the desired velocity.

Another hydraulic circuit branch, with which the present method can be used, has an assembly of four electrohydraulic proportional valves. A first one of these valves couples a first port of a hydraulic actuator, such as a double acting hydraulic cylinder, to the supply line containing pressurized fluid. A second electrohydraulic proportional valve couples a second port of the hydraulic actuator to the supply line, a third one of these valves is between the first port and a return line connected to a tank, and the fourth valve couples the second port to the return line. In this arrangement, activation of selected pairs of the four electrohydraulic proportional valves enables operation of the hydraulic actuator in several metering modes, which include powered extension, powered retraction, high side regeneration, and low side regeneration. In each metering mode, measurements of pressures at the ports of the hydraulic actuator and in the supply and return lines, as well as physical characteristics of the hydraulic actuator, are used along with the desired velocity to derive a valve flow coefficient for each electrohydraulic proportional valve which is to open in the selected mode. The respective valve flow coefficients then are used to determine the degree to which to open those valves in order to drive the hydraulic actuator at the desired velocity.

Another aspect of the present invention is using the equivalent flow coefficient for the hydraulic circuit branch to regulate pressure in the supply and return lines to properly drive the hydraulic actuator.

DETAILED DESCRIPTION OF THE INVENTION

Figure 1:
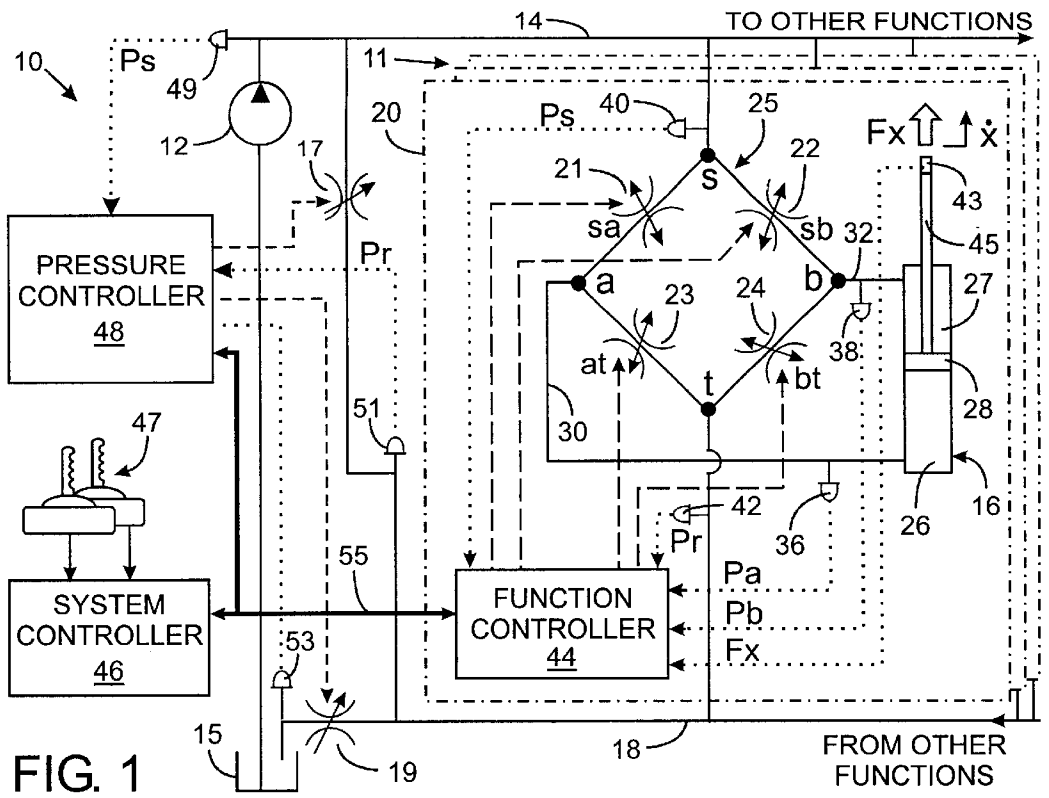
FIG. 1 is a schematic diagram of an exemplary hydraulic system incorporating the present invention.

With initial reference to FIG. 1, a hydraulic system 10 of a machine has mechanical elements operated by hydraulically driven actuators, such as cylinder 16 or rotational motors. Although the present control method is being described in terms of controlling a cylinder and piston arrangement in which an external linear force acts on the actuator, the method can be used to control a motor in which case the external force acting on the actuator would be expressed as torque in implementing the control method. The hydraulic system 10 includes a positive displacement pump 12 that is driven by a motor or engine (not shown) to draw hydraulic fluid from a tank 15 and furnish the hydraulic fluid under pressure to a supply line 14. It should be understood that the novel techniques for performing velocity control being described herein also can be implemented on a hydraulic system that employs a variable displacement pump and other types of hydraulic actuators. The supply line 14 is connected to a tank return line 18 by an unloader valve 17 (such as a proportional pressure relief valve) and the tank return line 18 is connected by tank control valve 19 to the system tank 15.

The supply line 14 and the tank return line 18 are connected to a plurality of hydraulic functions on the machine on which the hydraulic system 10 is located. One of those functions 20 is illustrated in detail and other functions 11 have similar components. The hydraulic system 10 is of a distributed type in that the valves for each function and control circuitry for operating those valves are located adjacent to the actuator for that function. For example, those components for controlling movement of the arm with respect to the boom of a backhoe are located at or near the arm cylinder or the junction between the boom and the arm.

In the given function 20, the supply line 14 is connected to node "s" of a valve assembly 25 which has a node "t" that is connected to the tank return line 18. The valve assembly 25 includes a node "a" that is connected by a first hydraulic conduit 30 to the head chamber 26 of the cylinder 16, and has another node "b" that is coupled by a second conduit 32 to the rod chamber 27 of cylinder 16. Four electrohydraulic proportional poppet valves 21, 22, 23, and 24 control the flow of hydraulic fluid between the nodes of the valve assembly 25 and thus control fluid flow to and from the cylinder 16. The first electrohydraulic proportional valve 21 is connected between nodes s and a, and is designated by the letters "sa". Thus the first electrohydraulic proportional valve 21 can control the flow of fluid between the supply line 14 and the head chamber 26 of the cylinder 16. The second electrohydraulic proportional valve 22, designated by the letters "sb", is connected between nodes "s" and "b" and can control fluid flow between the supply line 14 and the cylinder rod chamber 27. The third electrohydraulic proportional valve 23, designated by the letters "at", is connected between node "a" and node "t" and can control fluid flow between the head chamber 26 and the return line 18. The fourth electrohydraulic proportional valve 24, which is between nodes "b" and "t" and designated by the letters "bt", can control the flow between the rod chamber 27 and the return line 18.

The hydraulic components for the given function 20 also include two pressure sensors 36 and 38 which detect the pressures Pa and Pb within the head and rod chambers 26 and 27, respectively, of cylinder 16. Another pressure sensor 40 measures the pump supply pressure Ps at node "s", while pressure sensor 42 detects the return line pressure Pr at node "t" of the function 20. The sensors should be placed as close to the valve as possible to minimize velocity errors due to line loss effects. It should be understood that the various pressures measured by these sensors may be slightly different from the actual pressures at these points in the hydraulic system due to line losses between the sensor and those points. However the sensed pressures relate to and are representative of the actual pressures and accommodation can be made in the control methodology for such differences. Furthermore, pressure sensors 40 and 42 may not be present of all functions 11.

The pressure sensors 36, 38, 40 and 42 for the function 20 provide input signals to a function controller 44 which produces signals that operate the four electrohydraulic proportional valves 21–24. The function controller 44 is a microcomputer based circuit which receives other input signals from a computerized system controller 46, as will be described. A software program executed by the function controller 44 responds to those input signals by producing output signals that selectively open the four electrohydraulic proportional valves 21–24 by specific amounts to properly operate the cylinder 16.

The system controller 46 supervises the overall operation of the hydraulic system exchanging signals with the function controllers 44 and a pressure controller 48. The signals are exchanged among the three controllers 44, 46 and 48 over a communication network 55 using a conventional message protocol. The pressure controller 48, which is located on the machine near the pump 12, receives signals from a supply line pressure sensor 49 at the outlet of the pump, a return line pressure sensor 51, and a tank pressure sensor 53. In response to those pressure signals and commands from the system controller 46, the pressure controller 48 operates the tank control valve 19 and the unloader valve 17. However, if a variable displacement pump is used, the pressure controller 48 controls the pump.

Figure 2:
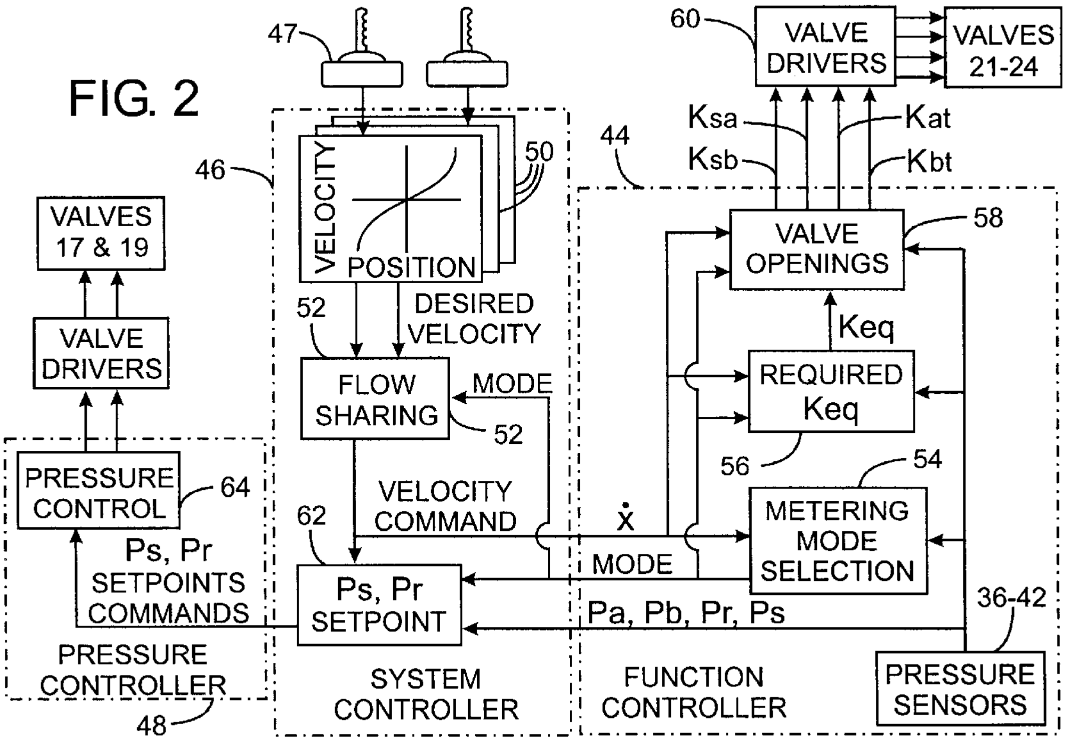
FIG. 2 is a control diagram for the hydraulic system.

With reference to FIG. 2, the control functions for the hydraulic system 10 are distributed among the different controllers 44, 46 and 48. Considering a single function 20, the output signals from the joystick 47 for that function are applied as input signals to the system controller 46. Specifically, the output signal from the joystick 47 is applied to a mapping routine 50 which converts the signal indicating the joystick position into a signal indicating a desired velocity for the hydraulic actuator being controlled. The mapping function can be linear or have other shapes as desired. For example, the first half of the travel range of the joystick from the neutral center position may map to the lower quartile of velocities, thus providing relatively fine control of the actuator at low velocity. In that case, the latter half of the joystick travel maps to the upper 75 percent range of the velocities. The mapping routine may be implemented by an arithmetic expression that is solved by the computer within system controller 46, or the mapping may be accomplished by a look-up table stored in the controller's memory. The output of the mapping routine 50 is a signal indicative of the raw velocity desired by the system user.

In an ideal situation, the raw, or desired, velocity is used to control the hydraulic valves associated with this function. However, in many instances, the desired velocity may not be achievable in view of the simultaneous demands placed on the hydraulic system by other functions 11 of the machine. For example, the total quantity of hydraulic fluid flow demanded by all of the functions may exceed the maximum output of the pump 12, in which case, the control system must apportion the available quantity among all the functions demanding hydraulic fluid, and a given function may not be able to operate at the full desired velocity. As a consequence, the raw velocities are applied to a flow sharing software routine 52, which compares the amount of fluid available for powering the machine to the total amount of fluid being demanded by the presently active hydraulic functions.

In order for the flow sharing routine to apportion the available fluid, the metering mode of each function must be known, as those modes, along with the velocity of each function, determine the demanded amounts of fluid and contribute to the aggregate flow of fluid available to power the functions. In the case of functions that operate a hydraulic cylinder and piston arrangement, such as cylinder 16 and piston 28 in FIG. 1, it is readily appreciated that in order to extend the piston rod 45 from the cylinder, hydraulic fluid must be supplied to the head chamber 26, and fluid must be supplied to the rod chamber 27 to retract the piston rod 45. However, because the piston rod 45 occupies some of the volume of the rod chamber 27, that chamber requires less hydraulic fluid to produce an equal amount of motion of the piston than is required by the head chamber. As a consequence, whether the actuator is in the extend or retract mode determines different amounts of fluid that are required at a given speed.

The fundamental metering modes in which fluid from the pump is supplied to one of the cylinder chambers 26 or 27 and drained to the return line from the other chamber are referred to as powered modes of operation, specifically powered extension or powered retraction. Hydraulic systems also employ regeneration metering modes in which fluid being drained from one cylinder chamber is fed back through the valve assembly 25 to supply the other cylinder chamber.

In a regeneration mode, the fluid can flow between the chambers through either the supply line node "s", referred to as "high side regeneration" or through the return line node "t" in "low side regeneration". It should be understood that in a regeneration mode, when fluid is being forced from the head chamber 26 into the rod chamber 27 of a cylinder, a greater volume of fluid is draining from the head chamber than is required in the smaller rod chamber. During a retraction in the low side regeneration mode, that-excess fluid enters the return line 18 from which it continues to flow either to the tank 15 or to other functions 11 operating in a low side regeneration mode that require additional fluid.

Regeneration also can occur when the piston rod 45 is being extended from the cylinder 16. In this case, an insufficient volume of fluid is exhausting from the smaller rod chamber 27 than is required to meet fill the head chamber 26. During an extension in the low side regeneration mode, the function has to receive additional fluid from the tank return line 18. That additional fluid either originates from another function, or from the pump 12 through the unloader valve 17. It should be understood that in this case, the tank control valve 19 is at least partially closed to restrict fluid in the return line 18 from flowing to the tank 15, so that fluid is supplied from another function 11 or indirectly from the pump 12. When the high side regeneration mode is used to extend the rod, the additional fluid comes from the pump 12.

In order to determine whether sufficient supply flow exists from all sources to produce the desired function velocities, the flow sharing routine 52 receives indications as to the metering mode of all the active functions. The flow sharing routine then compares the total supply flow of fluid to the total flow that would be required if every function operated at the desired velocity. The result of this processing is a set of velocity commands for the presently active functions. This determines the velocity at which the associated function will operate (a velocity command) and the commanded velocity may be less than the velocity desired by the machine operator, when there is insufficient supply flow. The flow sharing algorithm also may assign different priorities to the machine functions. Therefore, when there is an insufficient fluid supply to power all the active functions at their desired velocities, a greater proportion of the available fluid is sent to functions having a higher priority thus those functions will operate closer to their desired velocities than lower priority functions.

Each velocity command then is sent to the function controller 44 for the associated function 11 or 20. As will be recalled, the function controller 44 operates the electrohydraulic proportional valves, such as valves 21–24, which control the hydraulic actuator for that function. The metering mode for a particular function is determined by a metering mode selection routine 54 executed by the function controller 44 of the associated hydraulic function. The metering mode selection routine 54 can be a manual input device which is operable by the machine operator to determine the mode for a given function. Alternatively, an algorithm can be implemented by the function controller 44 to determine the optimum metering mode for that function at a particular point in time. For example, the metering mode selection component may receive the cylinder chamber pressures Pa and Pb along with the supply and return lines pressures Ps and Pr at the particular function. From those pressure measurements, the algorithm then determines whether sufficient pressure is available from the supply or return line 14 or 18 to operate in a given mode. The most efficient mode then is chosen. Once selected, the metering mode is communicated to the system controller 46 and other routines of the respective function controller 44.

Valve Control

The remaining routines 56 and 58 executed by the function controller 44 determine how to operate the electrohydraulic proportional valves 21–24 to achieve the commanded velocity of the piston rod 45. In each of the metering modes, only two of the valves in assembly 25 are active, or open. The two valves in the hydraulic circuit branch for the function can be modeled by a single equivalent coefficient, Keq, representing the equivalent fluidic conductance of the hydraulic branch in the selected metering mode. The exemplary hydraulic circuit branch includes the valve assembly 25 and the cylinder 16. The function controller 44 executes a software routine 56 that derives the equivalent conductance coefficient. The equivalent conductance coefficient is used along with the commanded velocity, the metering mode and the sensed pressures by a valve opening routine 58 to calculate individual valve conductance coefficients, which characterize fluid flow through each of the four valves 21–24 and thus the amount, if any, that each valve is to open. Those skilled in the art will recognize that in place of the equivalent conductance coefficient and the valve conductance coefficients the inversely related flow restriction coefficients can be used. Both conductance and restriction coefficients characterize the flow of fluid in a section or component of a hydraulic system and are inversely related parameters. Therefore, the generic terms "equivalent flow coefficient" and "valve flow coefficient" are used herein to cover both conductance and restriction coefficients.

The nomenclature used to describe the algorithms which determine the equivalent conductance coefficient, Keq and the individual valve coefficients is given in Table 1.

TABLE 1

| NOMENCLATURE | |
|---|---|
| a | denotes items related to head side of cylinder |
| b | denotes items related to rod side of cylinder |
| Aa | piston area in the head cylinder chamber |
| Ab | piston area in the rod cylinder chamber |
| Fx | equivalent external force on cylinder in the direction of velocity X |
| Ka | conductance coefficient for the active valve connected to node a |
| Kb | conductance coefficient for the active valve connected to node b |
| Ksa | conductance coefficient for valve sa between supply line and node a |
| Ksb | conductance coefficient for valve sb between supply line and node b |
| Kat | conductance coefficient for valve at between node a and return line |
| Kbt | conductance coefficient for valve bt between node b and return line |
| Keq | equivalent conductance coefficient |
| Pa | head chamber pressure |
| Pb | rod chamber pressure |
| Ps | supply line pressure |
| Pr | return line pressure |
| Peq | equivalent, or "driving", pressure |
| R | cylinder area ratio, Aa/Ab ($R \geqq 1.0$) |
| X | commanded velocity of the piston (positive in the extend direction) |

The derivation of the valve coefficients employs a different mathematical algorithm depending on the metering mode for the function 20. Thus the valve control process will be described separately for each of the four metering modes.

1. Powered Extension Mode

The hydraulic system 10 can be utilized to extend the piston rod 45 from the cylinder 16 by applying pressurized hydraulic fluid from the supply line 14 to the head chamber 26 and exhausting fluid from the rod chamber 27 to the tank return line 18. This metering mode is referred to as the "Powered Extension Mode." In general, this mode is utilized when the force acting on the piston 28 is negative and work must be done against that force in order to extend the piston rod 45 from cylinder 16. To produce that motion, the first and fourth electrohydraulic valves 21 and 24 are opened, while the other pair of valves 22 and 23 is kept closed.

The velocity of the rod extension is controlled by metering fluid through the first and fourth valves 21 and 24. The settings of the valve conductance coefficients Ksa and Kbt for those valves, together affect the velocity of the piston rod 45, given an equivalent force (Fx) and pressures Ps and Pr in the supply and return lines 14 and 18. Assuming no cavitation, the specific set of values for the individual valve conductance coefficients Ksa and Kbt are irrelevant, as only the resultant mathematical combination of those two coefficients, referred to as the equivalent conductance coefficient (Keq), is of consequence. Therefore, by knowing the cylinder area ratio R, the cylinder chamber pressures Pa and Pb, the supply and return line pressures Ps and Pr, and the commanded piston rod velocity $\dot{x}$, the function controller 44 can execute a software routine 56 to compute the required equivalent conductance coefficient Keq from the equation:

$$Keq = \frac{\dot{x}Ab}{\sqrt{R(Ps-Pa)+(Pb-Pr)}},\ \dot{x}>0 \tag{1}$$

where the various terms in this equation and in the other equations in this document are specified in Table 1. If the desired velocity is zero when using any mode, all four valves 21–24 are closed. If a negative velocity is desired, a different mode must be used. It should be understood that the calculation of the equivalent conductance coefficient Keq in any of the present control methods may yield a value that is greater than a maximum value that may be physically achievable given the constraints of the particular hydraulic valves and the cylinder area ratio R. In that case the maximum value for the equivalent conductance coefficient is used in subsequent arithmetic operations. Similarly, the commanded velocity also would be adjusted according to the expression: $\dot{x}=(Keq\_max/Keq)\,\dot{x}$ and used in subsequent calculations.

The area Aa of the surface of the piston in the head chamber 26 and the piston surface area Ab in the rod chamber 27 are fixed and known for the specific cylinder 16 which is utilized for this function 20. Knowing those surface areas and the present pressures Pa and Pb in each cylinder chamber, the equivalent force Fx acting on the cylinder can be determined by the function controller 44 according to either of the following expressions:

$$Fx=-PaAa+PbAb \tag{2}$$

$$Fx=Ab(-RPa+Pb) \tag{3}$$

The equivalent external force (Fx) as computed from equations (2) or (3) includes the effects of external load on the cylinder, line losses between each respective pressure sensors Pa and Pb and the associated actuator port, and cylinder friction. The equivalent external force actually represents the total hydraulic load seen by the valve, but expressed as a force.

Using actuator port pressure sensors to estimate this hydraulic load is a preferred embodiment. It should be understood that the equations for Keq here and elsewhere use this type of hydraulic load estimate implicitly. Alternatively, a load cell could be used to estimate the equivalent external force (Fx). However, in this case, since cylinder friction and workport line losses would not be taken into account, velocity errors would occur. The force Fx measured by the load cell is used in the term "Fx/Ab" which then is substituted for the terms "−RPa+Pb" in the expanded denominator of equation (1). Similar substitutions also would be made in the other expressions for equivalent conductance coefficient Keq and pressure setpoints given hereinafter.

If a rotary actuator is used, a total hydraulic load, expressed as an external torque, preferably is found using the measurements provided by the actuator port pressure sensors. Here too, an externally measured torque alternatively could be used to compute the equivalent conductance coefficient and the pressure setpoints.

The driving pressure, Peq, required to produce movement of the piston rod 45 is given by:

$$Peq=R(Ps-Pa)+(Pb-Pr) \quad (4)$$

If the driving pressure is positive, the piston rod 45 will move in the intended direction (i.e. extend from the cylinder) when both the first and fourth electrohydraulic proportional valves 21 and 24 are opened. If the driving pressure is not positive, the first and fourth valves 21 and 24 must be kept closed to avoid motion in the wrong direction, until the supply pressure Ps is increased to produce a positive driving pressure Peq.

If the present parameters indicate that the movement of the piston rod 45 will occur in the desired direction, the function controller 44 continues in the valve opening routine 58 by employing the equivalent conductance coefficient Keq to derive individual valve conductance coefficients Ksa, Ksb, Kat and Kbt for the four electrohydraulic proportional valves 21–24. A generic algorithm is employed to determine the individual conductance coefficients regardless of the metering mode.

In any particular metering mode two of the four electrohydraulic proportional valves are closed and thus have individual valve coefficients of zero. For example, the second and third electrohydraulic proportional valves 22 and 23 are closed in the Powered Extension Mode. Therefore, only the two open, or active, electrohydraulic proportional valves (e.g. valves 21 and 24) contribute to the equivalent conductance coefficient (Keq). One active valve is connected to node "a" and the other active valve to node "b" of the valve assembly 25. In the following description of that valve opening routine 58, the term Ka refers to the individual conductance coefficient for the active valve connected to node "a" (e.g. Ksa in the Powered Extension Mode) and Kb is the valve coefficient for the active valve connected to node "b" (e.g. Kbt in the Powered Extension Mode). The equivalent conductance coefficient Keq is related to the individual conductance coefficients Ka and Kb according to the expression:

$$Keq = \frac{KaKb}{\sqrt{Ka^2 + R^3 Kb^2}} \quad (5)$$

Rearranging this expression for each individual valve conductance coefficient, yields the following expressions:

$$Ka = \frac{R^{3/2} KbKeq}{\sqrt{Kb^2 - Keq^2}} \quad (6)$$

$$Kb = \frac{KaKeq}{\sqrt{Ka^2 - R^3 Keq^2}} \quad (7)$$

Figure 3:
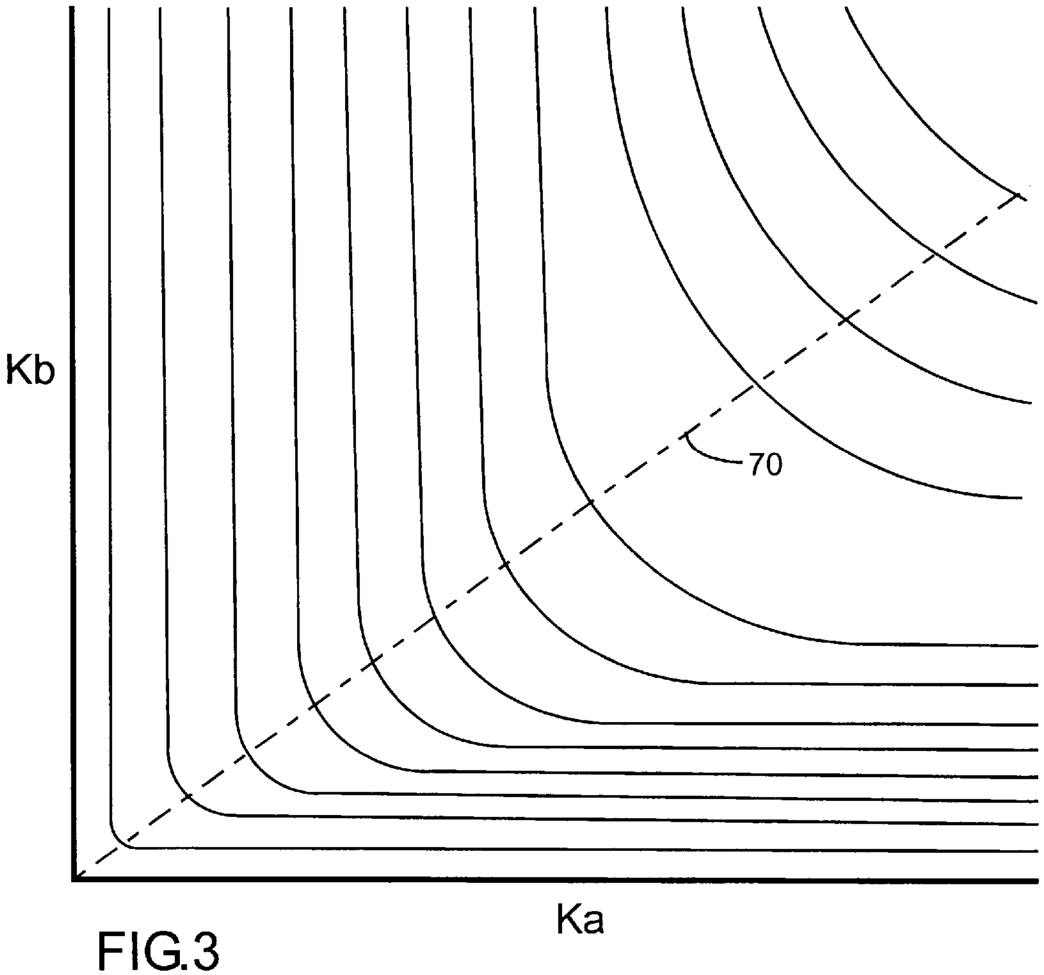
FIG. 3 depicts the relationship between conductance coefficients Ka and Kb for individual valves in the hydraulic system and each solid line represents an equivalent conductance coefficient Keq.

As is apparent, there are an infinite number of combinations of values for the valve conductance coefficients Ka and Kb, which equate to a given value of the equivalent conductance coefficient Keq. FIG. 3 depicts the relationship between Ka and Kb wherein each solid line represents a constant value of Keq.

However, recognizing that actual electrohydraulic proportional valves used in the hydraulic system are not perfect, errors in setting the values for Ka and Kb inevitably will occur, which in turn leads to errors in the controlled velocity of the piston rod 45. Therefore it is desirable to select values for Ka and Kb for which the error in the equivalent conductance coefficient Keq is minimized because Keq is proportional to the velocity $\dot{x}$. The sensitivity of Keq with respect to both Ka and Kb can be computed by taking the magnitude of the gradient of Keq as given in vector differential calculus. The magnitude of the gradient of Keq is given by the equation:

$$|\nabla Keq(K_a, K_b)| = \sqrt{\frac{K_a^6 + R^6 K_b^6}{(K_a^2 + R^3 K_b^2)^3}} \quad (8)$$

A contour plot of the resulting two-dimensional sensitivity of Keq to valve coefficients Ka and Kb has a valley in which the sensitivity is minimized for values of Ka and Kb at the bottom of the valley. The line at the bottom of that sensitivity valley is expressed by:

$$Ka=\mu Kb \quad (9)$$

where $\mu$ is the slope of the line. This line corresponds to the optimum or preferred valve conductance coefficient relationship between Ka and Kb to achieve the commanded velocity. The slope is a function of the cylinder area ratio R and can be found for a given cylinder design according to the expression $\mu=R^{3/4}$. For example this relationship becomes Ka=1.40 Kb for a cylinder area ratio of 1.5625. Superimposing a plot of the line given by equation (9) (broken line 70) onto the Keq curves of FIG. 3 reveals that the minimum coefficient sensitivity line intersects all the constant Keq lines.

In addition to equations (6) and (7) above, by knowing the value of the slope constant $\mu$ for a given hydraulic system function, the individual value coefficients are related to the equivalent conductance coefficient according to the expressions:

$$Ka = \sqrt{\mu^2 + R^3}\, Keq \quad (10)$$

$$Kb = \frac{\sqrt{\mu^2 + R^3}\, Keq}{\mu} \quad (11)$$

Therefore, two of expressions (6), (7), (10) and (11) can be solved to determine the valve conductance coefficients for the active valves in the current metering mode.

Returning to the specific example of function 20 operating in the Powered Extension Mode, the valve coefficients Ksb and Kat for the second and third electrohydraulic proportional valves 22 and 23 are set to zero as these valves are kept closed. The individual conductance coefficients Ksa and Kbt for the active first and fourth hydraulic valves 21 and 24 are defined by the following specific applications of the generic equations (6), (7), (9), (10) and (11):

$$Ksa = \frac{R^{3/2} KbtKeq}{\sqrt{Kbt^2 - Keq^2}} \quad (12)$$

$$Kbt = \frac{KsaKeq}{\sqrt{Ksa^2 - R^3 Keq^2}} \quad (13)$$

$$Ksa = \mu Kbt \quad (14)$$

$$Ksa = \sqrt{\mu^2 + R^3}\, Keq \quad (15)$$

-continued $$Kbt = \frac{\sqrt{\mu^2 + R^3}\,Keq}{\mu} \tag{16}$$

In order to operate the valves in the range of minimal sensitivity, either both equations (15) and (16) are solved or equation (16) is solved and the resultant valve coefficient then is used in equation (14) to derive the other valve coefficient. In other circumstances the valve coefficients can be derived using equation (12) or (13). For example a value for one valve coefficient can be selected and the corresponding equation (12) or (13) used to derive the other valve coefficient.

The resultant set of valve coefficients Ksa, Ksb, Kat and Kbt calculated by the valve opening routine 58 are supplied by the function controller 44 to valve drivers 60. The valve drivers 60 convert those coefficients into corresponding electrical currents to open the first and fourth electrohydraulic proportional valves 21 and 24 by the proper amount to achieve the desired velocity of the piston rod 45.

It is important to note here and elsewhere that the conversion of a valve coefficient to a corresponding electrical current implicitly depends upon the properties of the type of hydraulic oil used. Therefore, the table used in that conversion can be changed should it become necessary to use a different type of hydraulic fluid.

2. Powered Retraction Mode

The piston rod 45 can be retracted into the cylinder 16 by applying pressurized hydraulic fluid from the supply line 14 to the rod chamber 27 and exhausting fluid from the head chamber 26 to the tank return line 18. This metering mode is referred to as the "Powered Retraction Mode". In general, this mode is utilized when the force acting on the piston 28 is positive and work must be done against that force to retract the piston rod 45. To produce this motion, the second and third electrohydraulic valves 22 and 23 are opened, while the other pair of electrohydraulic proportional valves 21 and 24 are kept closed.

The velocity of the rod retraction is controlled by metering fluid through both the second and third electrohydraulic proportional valves 22 and 23 as determined by the corresponding valve conductance coefficients Ksb and Kat. This control process is similar to that just described with respect to the Powered Extension Mode. Initially the function controller 44 uses routine 56 to calculate the equivalent conductance coefficient (Keq) according to the equation:

$$Keq = \frac{-\dot{x}Ab}{\sqrt{R(Pa - Pr) + (Ps - Pb)}},\ \dot{x} < 0 \tag{17}$$

The driving pressure, Peq, required for producing movement of the piston rod 45 is given by:

$$Peq = R(Pa - Pr) + (Ps - Pb) \tag{18}$$

If the driving pressure is positive, the piston rod 45 will retract when both the second and third electrohydraulic proportional valves 22 and 23 are opened. If the driving pressure is not positive, the second and third valves 22 and 23 must be kept closed to avoid motion in the wrong direction, until the supply pressure Ps is increased to produce a positive driving pressure Peq.

The specific versions of the generic equations (6), (7), (9), (10) and (11) for the powered retraction mode are given by:

$$Kat = \frac{R^{3/2}KeqKsb}{\sqrt{Ksb^2 - Keq^2}} \tag{19}$$

$$Ksb = \frac{KatKeq}{\sqrt{Kat^2 - R^3Keq^2}} \tag{20}$$

$$Kat = \mu Ksb \tag{21}$$

$$Kat = \sqrt{\mu^2 + R^3}\,Keq \tag{22}$$

$$Ksb = \frac{\sqrt{\mu^2 + R^3}\,Keq}{\mu} \tag{23}$$

Therefore, the valve conductance coefficients Ksb and Kat for the active second and third electrohydraulic proportional valves 22 and 23 are derived from equations (19)–(23). In order to operate the valves in the range of minimal sensitivity, either both equations (22) and (23) are solved or equation (23) is solved and the resultant valve coefficient is used in equation (21) to derive the other valve coefficient. In other circumstances the valve coefficients can be derived using equations (19) and (20). For example a value for one valve coefficient can be selected and the corresponding equation (19) or (20) used to derive the other valve coefficient. The valve conductance coefficients Ksa and Kbt for the closed first and fourth electrohydraulic proportional valves 21 and 24 are set to zero. The resultant set of four valve coefficients are supplied by the function controller 44 to valve drivers 60.

3. High Side Regeneration Mode

As an alternative to the powered extension and retraction modes, a function 20 can operate in a regeneration mode in which fluid being drained from one cylinder chamber is fed back through the valve assembly 25 to fill the other cylinder chamber. In a "High Side Regeneration Mode", the fluid flows between the cylinder chambers 26 and 27 through supply line node "s".

When High Side Regeneration Mode is used to extend the piston rod 45, a smaller volume of fluid is exhausted from the rod chamber 27 than is required to power the larger head chamber 26. The additional fluid is fed to the function from the supply line 14 to supplement the fluid from the rod chamber 27. Thus, the pump 12 only has to furnish that relatively small additional amount of fluid to function 20 rendering the High Side Regeneration Mode more efficient in some cases than the Powered Extension Mode described previously.

The velocity of the rod extension is controlled by metering fluid through the first and second electrohydraulic proportional valves 21 and 22. The combined settings of the valve conductance coefficients Ksa and Ksb for those valves affect the velocity of the piston rod 45, given pressure Ps in the supply line 14 and an equivalent force (Fx). Those valve conductance coefficients are derived by the function controller 44 by initially calculating the equivalent conductance coefficient (Keq) according to the equation:

$$Keq = \frac{\dot{x}Ab}{\sqrt{R(Ps - Pa) + (Pb - Ps)}},\ \dot{x} > 0 \tag{24}$$

It should be noted that Keq is linearly proportional to the commanded velocity.

The driving pressure, Peq, required for producing movement of the piston rod 45 is given by:

$$Peq=R(Ps-Pa)+(Pb-Ps) \quad (25)$$

If the driving pressure is not positive, the first and second electrohydraulic proportional valves 21 and 22 must be kept closed to avoid motion in the wrong direction, until the supply pressure Ps is increased to produce a positive driving pressure Peq. It should be noted that in all of the metering modes the supply pressure does not always have to be greater that the cylinder inlet pressure for motion to occur in the correct direction as was commonly done in previous hydraulic systems. All the valves 21–24 in assembly 25 are held closed when a negative driving pressure exists.

The specific versions of the generic equations (6), (7), (9), (10) and (11) for the High Side Regeneration Mode are given by:

$$Ksa=\frac{R^{3/2}KsbKeq}{\sqrt{Ksb^2-Keq^2}} \quad (26)$$

$$Ksb=\frac{KsaKeq}{\sqrt{Ksa^2-R^3Keq^2}} \quad (27)$$

$$Ksa=\mu Ksb \quad (28)$$

$$Ksa=\sqrt{\mu^2+R^3}\,Keq \quad (29)$$

$$Ksb=\frac{\sqrt{\mu^2+R^3}\,Keq}{\mu} \quad (30)$$

The valve conductance coefficients Ksa and Ksb for the active first and second electrohydraulic proportional valves 21 and 22 are derived from equations (26)–(30). In order to operate the valves in the range of minimal sensitivity, either both equations (29) and (30) are solved or equation (30) is solved and the resultant valve coefficient is used in equation (28) to derive the other valve coefficient. In other circumstances the valve coefficients can be derived using equation (26) or (27). For example, a value for one valve coefficient can be selected and the corresponding equation (26) or (27) used to derive the other valve coefficient. The valve conductance coefficients Kat and Kbt for the closed third and fourth electrohydraulic proportional valves 23 and 24 are set to zero. The resultant valve coefficients are supplied by the function controller 44 to valve drivers 60.

4. Low Side Regeneration Mode

The exemplary machine hydraulic function 20 also can operate in a Low Side Regeneration Mode in which fluid being drained from one cylinder chamber is fed back through node "t" of the valve assembly 25 to fill the other cylinder chamber. The Low Side Regeneration Mode can be used to extend or retract the piston rod 45, and it is generally used when the external force is in the same direction as the desired movement. Even though Low Side Regeneration Mode does not require fluid to be supplied directly from the supply line 14, any additional fluid required to fill the head chamber 26 above that available from the rod chamber 27 comes via the tank return line 18 from fluid either exhausted from other functions 11 or flowing through the unloader valve 17.

The velocity of the rod is controlled by metering fluid through the third and fourth electrohydraulic proportional valves 23 and 24. The combined valve conductance coefficients Kat and Kbt for those valves affect the resultant velocity of the piston rod 45, given pressure Pr in the return line 18 and an equivalent force (Fx). Those valve conductance coefficients are derived by the function controller 44 by initially calculating the equivalent conductance coefficient (Keq) according to one of the following equations, depending upon the direction $\dot{x}$ of the desired piston rod motion:

$$Keq=\frac{\dot{x}Ab}{\sqrt{R(Pr-Pa)+(Pb-Pr)}},\ \dot{x}>0 \quad (31)$$

$$Keq=\frac{-\dot{x}Ab}{\sqrt{R(Pa-Pr)+(Pr-Pb)}},\ \dot{x}<0$$

The driving pressure, Peq, required for producing movement of the piston rod 45 is given by:

$$Peq=R(Pr-Pa)+(Pb-Pr),\dot{x}>0$$

$$Peq=R(Pa-Pr)+(Pr-Pb),\dot{x}<0 \quad (32)$$

In either case, if the driving pressure is not positive, the third and fourth electrohydraulic proportional valves 23 and 24 must be kept closed to avoid motion in the wrong direction, until the return line pressure Pr is adjusted to produce a positive driving pressure Peq.

The specific versions of the generic equations (6), (7), (9), (10) and (11) for the Low Side Regeneration Mode are given by:

$$Kat=\frac{R^{3/2}KbtKeq}{\sqrt{Kbt^2-Keq^2}} \quad (33)$$

$$Kbt=\frac{KatKeq}{\sqrt{Kat^2-R^3Keq^2}} \quad (34)$$

$$Kat=\mu Kbt \quad (35)$$

$$Kat=\sqrt{\mu^2+R^3}\,Keq \quad (36)$$

$$Kbt=\frac{\sqrt{\mu^2+R^3}\,Keq}{\mu} \quad (37)$$

The valve conductance coefficients Kat and Kbt for the active third and fourth electrohydraulic proportional valves 23 and 24 are derived from equations (33)–(37). In order to operate the valves in the range of minimal sensitivity, either both equations (36) and (37) are solved, or equation (37) is solved and the resultant valve coefficient is used in equation (35) to derive the other valve coefficient. In other circumstances the valve coefficients can be derived using equation (33) or (34). For example a value for one valve coefficient can be selected and the corresponding equation (33) or (34) used to derive the other valve coefficient. The valve conductance coefficients Ksa and Ksb for the closed first and second electrohydraulic proportional valves 21 and 22 are set to zero. The resultant valve coefficients are supplied by the function controller 44 to valve drivers 60.

Pressure Control

In order to achieve the commanded velocity $\dot{x}$, the pressure controller 48 must operate the unloader valve 17 to produce a pressure level in the supply line 14 which meets the fluid supply requirement of the cylinder 16 in function 20, as well as the other hydraulic functions of the machine. For that purpose, the system controller 46 executes a setpoint routine 62 which determines a separate pump supply pressure setpoint for each function of the machine. That supply pressure setpoint (Ps setpoint) is derived according to one of the following expressions depending upon the following selected metering mode:

Powered Extension Mode: $Ps$ setpoint =

$$\frac{\dot{x}^2 Ab^2}{RKeq^2} - \frac{(Pb - Pr)}{R} + Pa,\ \dot{x} > 0 \tag{38}$$

Powered Retraction Mode: $Ps$ setpoint =

$$\frac{\dot{x}^2 Ab^2}{Keq^2} - R(Pa - Pr) + Pb,\ \dot{x} < 0 \tag{39}$$

High Side Regeneration: $Ps$ setpoint =

$$\frac{\dot{x}^2 Ab^2}{(R-1)Keq^2} + \frac{RPa - Pb}{R-1},\ \dot{x} > 0 \tag{40}$$

This computation requires the value of the equivalent conductance coefficient Keq, which either can be obtained from the function controller 44 or if computational capacity exists in the system controller 46, that controller can independently compute this value. It should be observed that values for all the terms in equations (1), (17), and (24) are available to enable the system controller 46 to independently calculate the equivalent conductance coefficient Keq. In practice, it may be desirable to request a greater supply side pressure than that computed by these equations (38)–(40) so that the electrohydraulic proportional valves are more controllable and to take line losses into account. However, a greater supply pressure than necessary reduces the efficiency of the system.

A non-intuitive result of this pressure control strategy is that the supply pressure setpoint can be less than the pressure in the cylinder chamber into which the fluid is to flow. In some situations the respective cylinder chamber pressures Pa and Pb, are high due to the trapped pressure, and the equivalent force Fx acting on the piston rod is relatively low or even zero. Under such conditions, the desired movement of the piston can be produced by supplying fluid to the cylinder at a relatively low pressure.

Assume for example that in the Powered Extension Mode the head chamber pressure Pa is 100 bar, the rod chamber pressure Pb is 200 bar, the return line pressure Pr is near zero bar, the piston area Ab in the rod chamber is 1, and the cylinder area ratio (R) is 2. The equivalent force Fx acting on the piston rod 45 as given by equation (3) is Fx=1 (−2(100)+200)=0. Also note that the second and third terms to the right of the equal sign in equation (38) sum to zero. In this case, very little supply pressure is needed at low velocity and the pressure of the fluid supplied to the head chamber 26 can be less than the head chamber pressure (100 bar) and the rod still will extend from the cylinder. In previous hydraulic systems, the supply line pressure when a function was active always was set to at least a predefined minimum level (e.g. 20 bar) greater than the cylinder inlet pressure. This control constraint is not required according to the present pressure control strategy in any of the metering modes described.

Because the Powered Extension, Powered Retraction, and High Side Regeneration modes do not draw any fluid from the return line 18, its pressure setpoint (Pr setpoint) for functions in these modes is set to a value corresponding to minimum pressure.

In the Low Side Regeneration Mode, the hydraulic function draws any required fluid from the return line 18. Therefore, a pressure setpoint (Pr setpoint) for the return line 18 has to be derived according to the expressions:

Low Side Regeneration: $Pr$ setpoint =

$$\frac{\dot{x}^2 Ab^2}{(R-1)Keq^2} + \frac{RPa - Pb}{R-1},\ \dot{x} > 0 \tag{41}$$

$$Pr \text{ setpoint} = \text{minimum return pressure},\ \dot{x} \le 0$$

Because fluid is not drawn from the supply line by machine function 20 in the Low Side Regeneration Mode, the supply pressure setpoint (Ps setpoint) is set to a minimum pressure value.

The system controller 46 similarly calculates supply and return line pressure setpoints for each of the other presently active functions of the hydraulic system 10. From those individual function setpoints, the system controller 46 selects the supply line pressure setpoint having the greatest value and the return line pressure setpoint having the greatest value. Those selected greatest values are sent to the pressure controller 48 as commanded supply and return line pressure setpoints.

The pressure controller 48 uses the supply line pressure setpoint (Ps setpoint) in controlling the unloader valve 17 to produce that setpoint pressure in the supply line 14. Alternatively when as variable displacement pump is employed, the pressure setpoint is used to control the pump so that the desired output pressure is produced.

The pressure control routine 64 also operates the tank control valve 19 to achieve the desired pressure in the tank return line 18, as indicated by return line pressure setpoint (Pr setpoint). Specifically, the pressure control routine 64 governs the closing of the tank control valve 19 to restrict the flow into the tank 15 as necessary to increase pressure in the tank return line 18. Restriction of the flow into the tank 15 is used to increase the pressure within the tank return line when one of the functions of the hydraulic system 10 is extending in the Low Side Regeneration Mode. When restricting the flow into the tank 15 via the tank control valve 19 is insufficient to build up the requisite pressure within the tank return line 18, the function requiring that pressure level will operate at a lower than desired speed or not at all until the desired pressure is achieved.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method of operating a hydraulic system in which a hydraulic actuator is connected in a circuit branch between a supply line containing pressurized fluid and a return line connected to a tank, said method comprising:

requesting a desired velocity for the hydraulic actuator;

sensing a parameter which varies with changes of a force acting on the hydraulic actuator;

sensing at least one of pressure in the supply line and pressure in the return line to produce a pressure measurement set;

deriving an equivalent flow coefficient which characterizes fluid flow through the hydraulic circuit branch, wherein the equivalent flow coefficient is selected from a group consisting of a conductance coefficient and a restriction coefficient and is based on the desired velocity, the pressure measurement set, and the parameter; and controlling the fluid in the hydraulic system based on the equivalent flow coefficient.

2. The method as recited in claim 1 wherein sensing a parameter comprises sensing a pressure produced by the force acting on the hydraulic actuator.

3. The method as recited in claim 1 wherein the hydraulic actuator is connected in series with a valve between the supply line and the a return line; and controlling the fluid in the hydraulic system comprises activating the valve based on the equivalent flow coefficient.

4. The method as recited in claim 1 wherein controlling the fluid in the hydraulic system comprises:

calculating a pressure setpoint based on the equivalent flow coefficient; and controlling pressure in at least one of the supply line and the return line in response to the pressure setpoint.

5. The method as recited in claim 4 further comprising:

sensing pressure in the return line to produce a return pressure measurement;

wherein calculating a pressure setpoint also is based on the return pressure measurement; and wherein controlling the pressure controls pressure in the supply line.

6. The method as recited in claim 4 further comprising:

sensing a pressure produced by the force acting on the hydraulic actuator to produce an actuator pressure measurement; and wherein calculating a pressure setpoint also is based on the actuator pressure measurement.

7. The method as recited in claim 1 wherein controlling the fluid in the hydraulic system comprises using the parameter to control pressure in at least one of the supply line and the return line in response to the force acting on the hydraulic actuator.

8. A method of operating a hydraulic system in which a hydraulic actuator is connected in a circuit branch between a supply line containing pressurized fluid and a return line connected to a tank, said method comprising:

sensing pressure in the supply line to produce a supply pressure measurement;

sensing pressure in the return line to produce a return pressure measurement;

sensing a parameter which varies with changes of a force acting on the hydraulic actuator;

deriving an equivalent flow coefficient which characterizes fluid flow through the hydraulic circuit and which is derived from the supply pressure measurement, the return pressure measurement, and the parameter; and controlling the fluid in the hydraulic system based on the equivalent flow coefficient.

9. The method as recited in claim 8 wherein determining the parameter comprises sensing a pressure produced by the force acting on the hydraulic actuator.

10. The method as recited in claim 8 wherein the hydraulic actuator has a first port and a second port, and sensing a parameter comprises:

sensing pressure at the first port to produce a first port pressure measurement; and sensing pressure at the second port to produce a second port pressure measurement.

11. The method as recited in claim 8 further comprises producing a requested velocity for the hydraulic actuator, and wherein equivalent flow coefficient also is based on the requested velocity.

12. In a hydraulic system having a circuit branch in which a first electrohydraulic proportional valve couples a first port of a hydraulic actuator to a supply line containing pressurized fluid and a second electrohydraulic proportional valve couples a second port of the hydraulic actuator to a return line connected to a tank, a method comprising:

sensing pressure in the supply line;

sensing pressure in the return line;

sensing pressure at the first port;

sensing pressure at the second port;

deriving an equivalent flow coefficient, Keq, representing fluid conduction of the hydraulic circuit branch, wherein that deriving is based on the pressure in the supply line, the pressure in the return line, the pressure at the first port, and the pressure at the second port; and controlling operation of the circuit branch based on the equivalent flow coefficient.

13. The method as recited in claim 12 wherein controlling operation of the circuit branch comprises activating the first electrohydraulic proportional valve and the second electrohydraulic proportional valve based on the equivalent flow coefficient.

14. The method as recited in claim 12 wherein the hydraulic actuator comprises a cylinder and a piston which defines first and second chambers in the cylinder, wherein the piston has a first surface area in the first chamber and a second surface area in the second chamber.

15. The method as recited in claim 14 wherein the equivalent flow coefficient is derived based on the surface area of the piston in at least one of the first chamber and the second chamber.

16. The method as recited in claim 15 further comprising producing a commanded velocity for the piston; and wherein the equivalent flow coefficient is derived further based on the commanded velocity.

17. The method as recited in claim 12 further comprising producing a commanded velocity for the piston; and wherein the equivalent flow coefficient is derived further based on the commanded velocity.

18. The method as recited in claim 12 wherein controlling operation of the circuit branch comprises:

calculating a pressure setpoint based on the equivalent flow coefficient; and controlling the pressure in at least one of the supply line and the return line in response to the pressure setpoint.

19. The method as recited in claim 12 further comprising:

calculating a pressure setpoint for the supply line based on the equivalent flow coefficient; and controlling the pressure in the supply line in response to the pressure setpoint.

20. The method as recited in claim 19 wherein the hydraulic system includes other circuit branches; and further comprises for each of the other circuit branches calculating a pressure setpoint for the supply line; and selecting the pressure setpoint having the greatest value for use in controlling the pressure in the supply line.

21. The method as recited in claim 12 further comprising:

calculating a pressure setpoint for the supply line based on the equivalent flow coefficient, the pressure at the first port and the pressure at the second port; and controlling the pressure in the supply line in response to the pressure setpoint.

22. The method as recited in claim 21 wherein the controlling the pressure in the supply line sets that pressure to a level that is less than the pressure at the first port.

23. The method as recited in claim 12 further comprising:

calculating a pressure setpoint for the return line based on the equivalent flow coefficient; and controlling the pressure in the return line in response to the pressure setpoint.

24. The method as recited in claim 23 wherein the hydraulic system includes other circuit branches; and further comprises for each of the other circuit branches calculating a pressure setpoint for the return line; and selecting the pressure setpoint having the greatest value for use in controlling the pressure in the return line.

25. The method as recited in claim 12 further comprising:

calculating a pressure setpoint for the return line based on the equivalent flow coefficient, the pressure at the first port and the pressure at the second port; and controlling the pressure in the return line in response to the pressure setpoint.

26. In a hydraulic system having a circuit branch in which a first electrohydraulic proportional valve couples a first port of a hydraulic actuator to a supply line containing pressurized fluid, and a second electrohydraulic proportional valve couples a second port of the hydraulic actuator to the supply line, a third electrohydraulic proportional valve couples the first port to a return line connected to a tank, and a fourth electrohydraulic proportional valve couples the second port to the return line, a method comprising:

selecting a direction in which the hydraulic actuator is to move;

designating given ones of the first, second, third and fourth electrohydraulic proportional valves to be operated to produce movement of the hydraulic actuator in the direction that is selected;

sensing pressure in the supply line to produce a supply pressure measurement, Ps;

sensing pressure in the return line to produce a return pressure measurement, Pr;

sensing pressure at the first port to produce a first port pressure measurement, Pa;

sensing pressure at the second port to produce a second port pressure measurement, Pb;

deriving an equivalent flow coefficient representing flow of the hydraulic circuit branch, wherein that deriving is selected from a group consisting of a conductance coefficient and a restriction coefficient and is based on the supply pressure measurement, the return pressure measurement, the first port pressure measurement and the second port pressure measurement; and activating the given ones of the first, second, third and fourth electrohydraulic proportional valves in response to the equivalent flow coefficient to move the hydraulic actuator in the direction that is selected.

27. The method as recited in claim 26 wherein the hydraulic actuator comprises a cylinder and a piston which defines a head chamber to which the first port is connected and a rod chamber to which the second port is connected and the piston having a cylinder area ratio R which is a ratio of a surface area Aa of the piston in the head chamber to a surface area Ab of the piston in the rod chamber; and the method further comprises producing a commanded velocity $\dot{x}$ for the piston.

28. The method as recited in claim 27 wherein:

designating given ones of the first, second, third and fourth electrohydraulic proportional valves designates the first and fourth electrohydraulic proportional valves; and the equivalent flow coefficient, Keq, is derived according to the expression:

$$Keq = \frac{\dot{x}Ab}{\sqrt{R(Ps - Pa) + (Pb - Pr)}}.$$

29. The method as recited in claim 28 further comprising:

calculating a pressure setpoint (Ps setpoint) according to the expression:

$$Ps \text{ setpoint} = \frac{\dot{x}^2 Ab^2}{RKeq^2} - \frac{(Pb - Pr)}{R} + Pa; \text{ and}$$

controlling the pressure in the supply line in response to the pressure setpoint.

30. The method as recited in claim 27 wherein:

designating given ones of the first, second, third and fourth electrohydraulic proportional valves designates the second and third electrohydraulic proportional valves; and the equivalent flow coefficient, Keq, is derived according to the expression:

$$Keq = \frac{-\dot{x}Ab}{\sqrt{R(Pa - Pr) + (Ps - Pb)}}.$$

31. The method as recited in claim 30 further comprising:

calculating a pressure setpoint (Ps setpoint) according to the expression:

$$Ps \text{ setpoint} = \frac{\dot{x}^2 Ab^2}{Keq^2} - R(Pa - Pr) + Pb; \text{ and}$$

controlling the pressure in the supply line in response to the pressure setpoint.

32. The method as recited in claim 27 wherein:

designating given ones of the first, second, third and fourth electrohydraulic proportional valves designates the first and second electrohydraulic proportional valves; and the equivalent flow coefficient, Keq, is derived according to the expression:

$$Keq = \frac{\dot{x}Ab}{\sqrt{R(Ps - Pa) + (Pb - Ps)}}.$$

33. The method as recited in claim 32 further comprising:

calculating a pressure setpoint (Ps setpoint) according to the expression:

$$Ps \text{ setpoint} = \frac{\dot{x}^2 Ab^2}{(R-1)Keq^2} + \frac{RPa - Pb}{R - 1}; \text{ and}$$

controlling the pressure in the supply line in response to the pressure setpoint.

34. The method as recited in claim 27 wherein:

designating given ones of the first, second, third and fourth electrohydraulic proportional valves designates the third and fourth electrohydraulic proportional valves; and the equivalent flow coefficient, Keq, is derived according to an expression selected from a group consisting of:

$$Keq = \frac{\dot{x}Ab}{\sqrt{R(Pr - Pa) + (Pb - Pr)}}$$

$$Keq = \frac{-\dot{x}Ab}{\sqrt{R(Pa - Pr) + (Pr - Pb)}}.$$

35. The method as recited in claim 34 further comprising:

calculating a pressure setpoint (Pr setpoint) for the return line according to the expression:

$$Pr \text{ setpoint} = \frac{\dot{x}^2 Ab^2}{(R-1)Keq^2} + \frac{RPa - Pb}{R-1}; \text{ and}$$

controlling the pressure in the return line in response to the pressure setpoint.

36. The method as recited in claim 35 wherein the hydraulic system also includes a tank control valve coupling the return line to the tank; and controlling the pressure in the return line selectively controls an amount that the tank control valve is open.

37. A method of operating an electrohydraulic proportional valve which is connected in series with a hydraulic actuator in a hydraulic circuit branch between a supply line containing pressurized fluid and a return line connected to a tank, said method comprising:

requesting a commanded velocity $\dot{x}$ for the hydraulic actuator;

sensing a force Fx acting on the hydraulic actuator;

sensing pressure in at least one of the supply line and the return line to produce a pressure measurement;

calculating an equivalent flow coefficient, representing fluid conductance of the hydraulic circuit branch, wherein the calculating employs the force, the pressure measurement, and a surface area on which hydraulic fluid acts in the hydraulic actuator; and activating the electrohydraulic proportional valve based on the equivalent flow coefficient to control the hydraulic actuator.

38. A method of operating a hydraulic system in which an electrohydraulic proportional valve is connected to a hydraulic actuator and to at least one of a supply line containing pressurized fluid and a return line connected to a tank, said method comprising:

requesting a desired velocity for the hydraulic actuator;

sensing a parameter which varies with changes of a force acting on the hydraulic actuator;

sensing at least one of pressure in the supply line and pressure in the return line to produce a pressure measurement set;

deriving an equivalent flow coefficient which characterizes fluid flow through the electrohydraulic proportional valve, wherein the equivalent flow coefficient is based on the desired velocity, the pressure measurement set, and the parameter; and controlling operation of the electrohydraulic proportional valve based on the equivalent flow coefficient.

39. The method as recited in claim 38 wherein sensing a parameter comprises sensing a pressure produced by the force acting on the hydraulic actuator.

40. A method of operating a hydraulic system in which a hydraulic actuator is connected in a circuit branch to a supply line containing pressurized fluid and a return line connected to a tank, said method comprising:

requesting a desired motion for the hydraulic actuator;

sensing a parameter which varies with changes of a force acting on the hydraulic actuator;

deriving a control value which characterizes fluid flow through the hydraulic circuit and which is derived from the desired motion and the parameter;

controlling pressure in at least one of the supply line and the return line in response to the parameter; and controlling the fluid in the hydraulic system based on the control value.

41. The method as recited in claim 40 further comprising:

sensing pressure in the supply line to produce a supply pressure measurement; and sensing pressure in the return line to produce a return pressure measurement.

42. The method as recited in claim 41 wherein deriving a control value comprises producing an equivalent flow coefficient which characterizes fluid flow through the hydraulic circuit and which is derived from the supply pressure measurement, the return pressure measurement, and the parameter.

* * * * *